US007143979B2

(12) United States Patent
Wood et al.

(10) Patent No.: US 7,143,979 B2
(45) Date of Patent: Dec. 5, 2006

(54) VEHICLE WINDSHIELD

(75) Inventors: Jeffrey H. Wood, Eureka, MO (US); Terry A. Sewell, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/452,663

(22) Filed: May 30, 2003

(65) Prior Publication Data

US 2004/0238690 A1    Dec. 2, 2004

(51) Int. Cl.
  *B64C 1/14*    (2006.01)
(52) U.S. Cl. ..................... 244/129.3; 244/119
(58) Field of Classification Search ............. 244/129.3, 244/121, 122 AF, 133; 296/96.19
  See application file for complete search history.

(56) References Cited

U.S. PATENT DOCUMENTS

| H0451 H | * | 4/1988 | Pinnell ........................ 244/121 |
| 4,874,654 A | * | 10/1989 | Funaki et al. ............... 428/192 |
| 5,289,996 A | * | 3/1994 | Speelman, III ....... 244/122 AF |
| 6,199,795 B1 | * | 3/2001 | Williams ...................... 244/15 |
| 6,440,569 B1 | * | 8/2002 | Kanamori et al. .......... 428/429 |
| 6,461,704 B1 | | 10/2002 | Matsco et al. |
| 6,752,355 B1 | * | 6/2004 | Wood ................... 244/122 AF |

FOREIGN PATENT DOCUMENTS

| EP | 0597624 | 10/2001 |
| JP | 2001354781 | 12/2001 |
| JP | 2002001759 | 1/2002 |

* cited by examiner

*Primary Examiner*—Galen Barefoot
(74) *Attorney, Agent, or Firm*—Lee & Hayes, PLLC

(57) ABSTRACT

An injection molded windshield is provided for a vehicle. The injection molded acrylic or polycarbonate windshield enables vehicle shape design flexibility while achieving lower aerodynamic drag. The injection molded windshields offer additional benefits for the crew by increasing visibility area with larger windshields while reducing aero noise. The vehicle includes a body and an injection molded window attached to the body. The injection molded windshield is shaped to conform to the fuselage. The injection molded windshield is formed of at least one of an injection molded acrylic or polycarbonate material. The injection molded windshield is impact and ballistic tolerant.

20 Claims, 3 Drawing Sheets

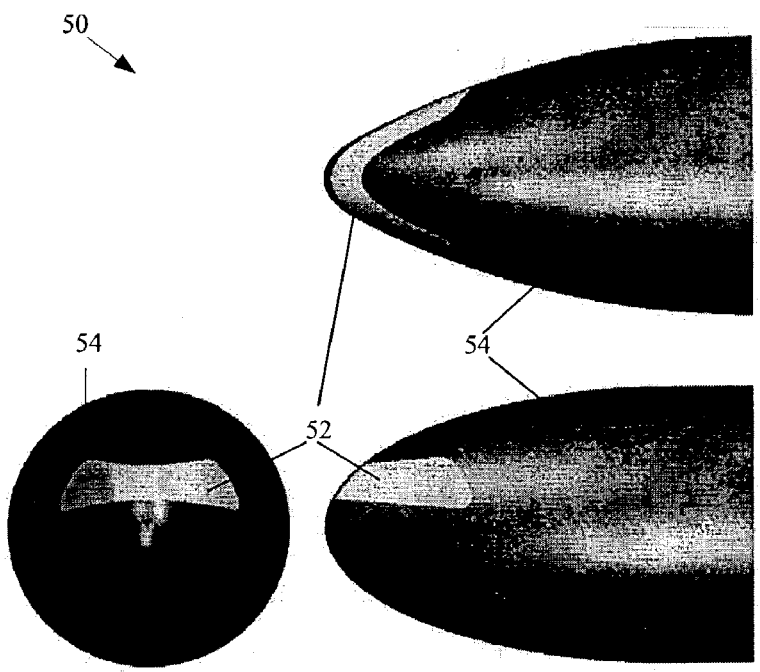
FIG. 5A.
FIG. 5B.
FIG. 5C.
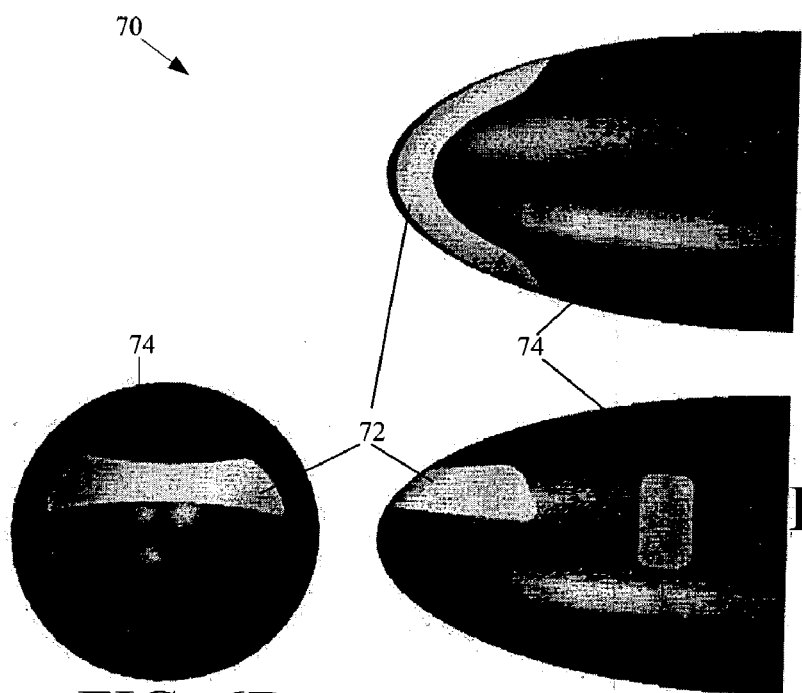
FIG. 6A.
FIG. 6B.
FIG. 6C.

VEHICLE WINDSHIELD

GOVERNMENT LICENSE RIGHTS

This invention was made with Government support under U.S. Government contract F33615-97-2-3407 awarded by the Air Force. The Government has certain rights in this invention.

RELATED APPLICATIONS

This invention relates to copending U.S. patent application Ser. No. 10/030,539, filed Nov. 22, 2002, and U.S. patent application Ser. Nos. 10/366,949, 10/367,024, 10/367,062, 10/367,064, and 10/367,404, all of which were filed on Feb. 13, 2003 and which are all hereby incorporated by reference.

FIELD OF THE INVENTION

This invention relates generally to vehicles and, more specifically, to windshields for vehicles.

BACKGROUND OF THE INVENTION

New aircraft are being designed with more fuel-efficient, aerodynamically-shaped forward fuselages that reduce drag while providing better cockpit frontal vision. In addition to increasing fuel economy, aircraft of the future include sleek aesthetics that symbolize 21st century aircraft. One limiting factor in producing an aerodynamic forward fuselage is currently known planar cockpit windshields (see FIG. 1).

Current windshield technology utilizes glass ply laminated planar windows that cannot be shaped with an efficient aerodynamic shape. Current windshield designs employ mature technology. As such, glass ply laminates are substantially planar with little or no curvature (see FIG. 2). Current windshields include heavy frames located between panes. These frames do not present a smooth aerodynamic surface that is flush with the fuselage. As a result, current windshields produce unnecessary drag. Also, many labor-hours and their attendant costs are needed for installing the panes and support frames. This design is not well-suited for next generation aircraft that entail enhanced aerodynamics produced with reduced labor-hours.

Therefore, there is an unmet need in the art for easy-to-install, aerodynamically-shaped windshields.

SUMMARY OF THE INVENTION

The present invention provides injection molded acrylic or polycarbonate windshields for vehicles. The injection molded acrylic or polycarbonate windshields enable vehicle shape design flexibility while achieving lower aerodynamic drag. Furthermore, fabrication and installation costs are reduced from those costs for currently known windshields. The injection molded windshields offer additional benefits for a vehicle's crew by providing larger windshields with increased visibility areas and reduced aero noise. The present invention allows the elimination of conventional windshield wipers, thereby reducing drag and noise. Polycarbonate materials offer increased impact and/or ballistic tolerance over conventional glass windows.

In one aspect of the invention, the vehicle is an aircraft, the body is a fuselage of the aircraft, and the injection molded window is an injection molded windshield.

In another aspect of the invention, the aircraft is a commercial aircraft and the injection molded windshield is shaped to conform to the fuselage.

In still another aspect of the invention, the injection molded windshield is formed of at least one of an injection molded acrylic or an injection molded polycarbonate material.

BRIEF DESCRIPTION OF THE DRAWINGS

The preferred and alternative embodiments of the present invention are described in detail below with reference to the following drawings.

FIGS. 5A–C and 6A–C illustrate various views of different fuselage configurations that include cockpit windshields formed in accordance with the present invention.

DETAILED DESCRIPTION OF THE INVENTION

By way of overview, the present invention provides an injection molded acrylic or polycarbonate window, such as without limitation a windshield for a vehicle, such as without limitation aircraft, trains, tanks, other land vehicles, ships and underwater vehicles.

Figure 1:
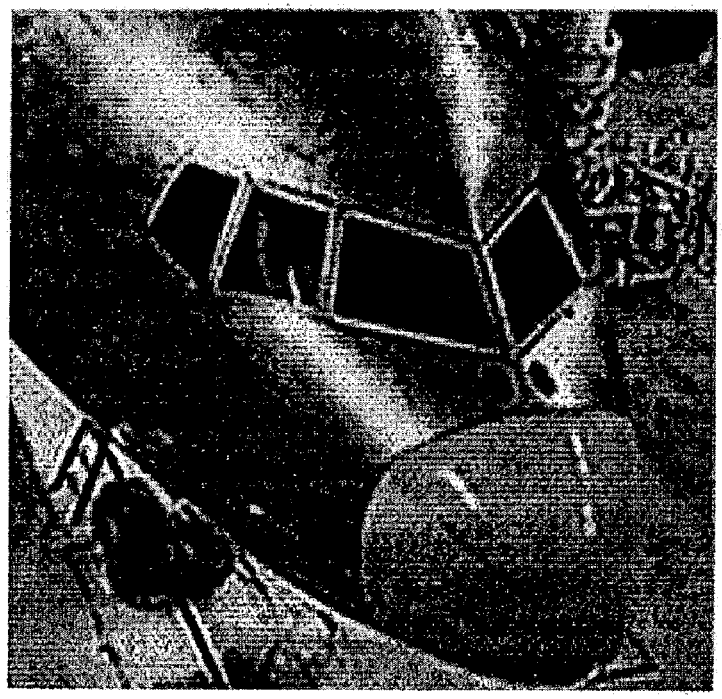
FIG. 1 illustrates a perspective view of a windshield formed in accordance with the prior art.
Figure 2:
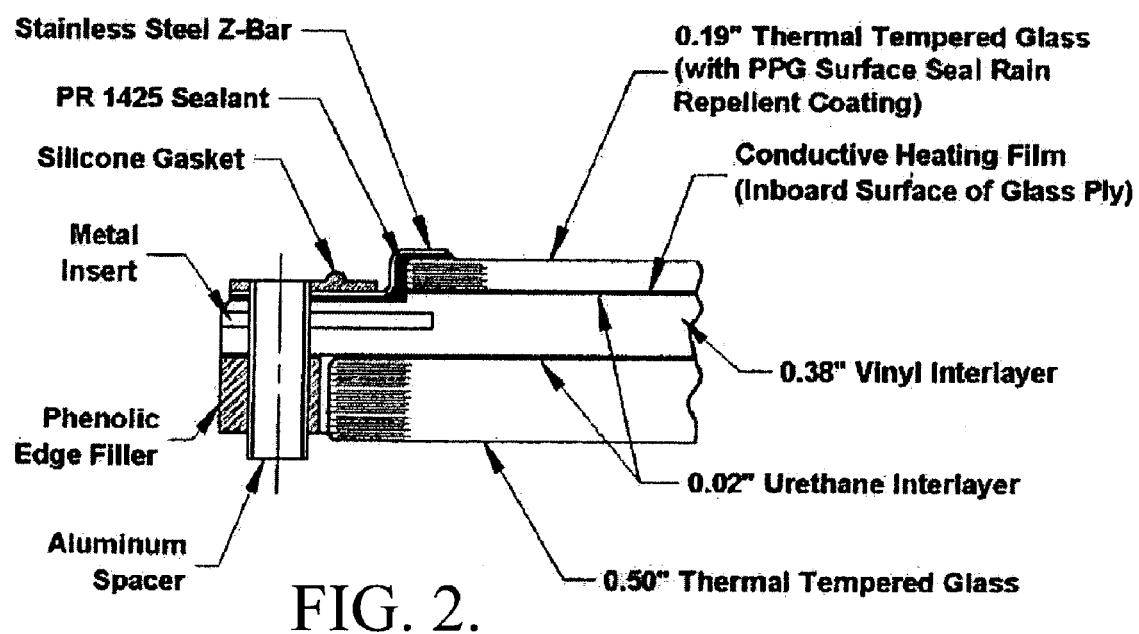
FIG. 2 illustrates a partial cross-sectional view of a windshield formed in accordance with the prior art.
Figure 3:
FIG. 3 is a perspective view of an aircraft with a windshield in accordance with the present invention.
Figure 4:
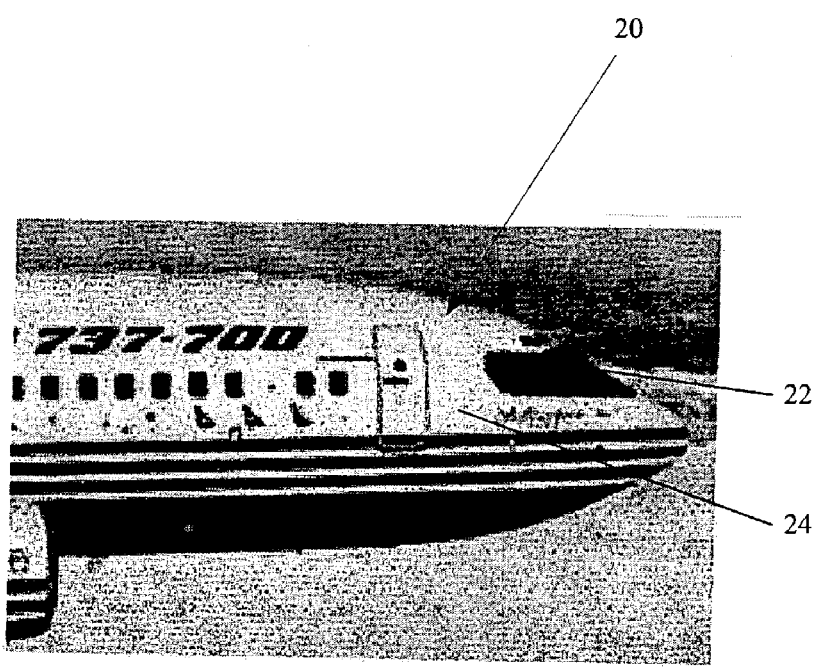
FIG. 4 illustrates a side view of the aircraft shown in the FIG. 3.

As shown in FIGS. 3 and 4, a commercial aircraft 20, such as without limitation Boeing 737-700, includes an injection molded acrylic, such as without limitation Atoglas V0-44, Dow Chemical Calibre 300-6, or Bayer 3103-112, polycarbonate windshield 22. The windshield 22 is attached to a fuselage 24 of the aircraft 20. The windshield 22 is suitably produced by an injection molding process in a prefabricated mold to produce a shape that conforms to the fuselage 24. The windshield 22 is securely attached to the fuselage 24 by various fastener mechanisms, such as without limitation a metal edge that is bonded to the windshield 22 whereby the metal edge is attached by fasteners to frame members (not shown) of the fuselage 24. Other fastener mechanisms for an injection molded windshield or canopy are shown and described in co-pending U.S. patent application Ser. No. 10/030,539, filed Nov. 22, 2002, and U.S. patent application Ser. Nos. 10/366,949, 10/367,024, 10/367,062, 10/367,064, and 10/367,404, all of which were filed on Feb. 13, 2003 and which are all hereby incorporated by reference.

Because the windshield 22 is implemented without an internal frame assembly, the only seam that is present is located where the windshield 22 meets the fuselage 24. Advantageously, this presents a smooth aerodynamic shape on the outer surface of the aircraft 20. Also, because the windshield 22 does not include an internal frame, the windshield 22 and attachment mechanisms (not shown) add much less weight than do framed windshield applications currently known in the art. Also, because no intermediate frame numbers are used, attaching the windshield 22 to the fuselage 24 is much less labor intensive than currently known framed windshield assemblies. It will be appreciated that the injection molded acrylic or polycarbonate window can be implemented at various locations of the aircraft 20 or any other vehicle.

FIGS. 5A–C illustrate top, front, and side views of an aircraft 50 with an injection molded acrylic or polycarbonate windshield 52 mounted in a forward, upper end of a fuselage 54. The fuselage 54 is pinched at the forward end of the fuselage 54. The windshield 52 is formed in a mold that is shaped to conform to the shape of the fuselage 54. The windshield 52 extends around the end of the fuselage 54 to allow pilots to easily view objects in front of aircraft 50 as well as to the side.

FIGS. 6A–C illustrate top, front, and side views of an aircraft 70 that includes an injection molded acrylic or polycarbonate windshield 72 that is molded to conform with an upper front end of a fuselage 74. The fuselage 74 has a rounded shape at the nose end of the fuselage 74 that is similar to a bullet. The windshield 72 wraps around the end of the fuselage 74 to allow nearly unrestricted visibility.

The present invention allows substantial drag reduction when combined with aerodynamic fuselage shaping. Drag reduction equals enhanced performance, which translates into reduced fuel consumption.

Injection molded windshields offer additional benefits for the crew by increasing visibility area with larger windshields. Also, in flight noise is reduced because the surface of the injection molded windshield is smooth.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for a vehicle having a window opening in a curved section of the vehicle, comprising:
   a single injection molded window panel shaped to fill a window opening in a curved section of a vehicle and having a curved outer surface configured to generally conform to an outer shape of the curved section of the vehicle; and
   an attachment device configured to attach an inner surface of the single injection molded window panel to the curved section of the vehicle.

2. The apparatus of claim 1, wherein the curved section of the vehicle includes a forward end of the vehicle.

3. The apparatus of claim 1, wherein the single injection molded window panel includes at least one of:
   an injection molded acrylic; and
   an injection molded polycarbonate material.

4. The apparatus of claim 1, wherein the single injection molded window panel is an injection molded windshield.

5. The apparatus of claim 1, wherein the vehicle includes a commercial aircraft.

6. The apparatus of claim 1, wherein the vehicle includes a land vehicle, including one of:
   an automobile;
   a truck; and
   a train.

7. The apparatus of claim 1, wherein the vehicle includes a water vehicle, including one of:
   a boat; and
   a submarine.

8. The apparatus of claim 1, wherein the attachment device is a frameless device such that an edge of the curved outer surface of the single injection molded window directly contacts an outer surface of the curved section of the vehicle.

9. The apparatus of claim 8, wherein the attachment device includes a bracket bonded to the inner surface of the single injection molded window panel and configured to be coupled to the curved section of the vehicle.

10. A method for providing a single windshield in a forward section of a fuselage of an aircraft, comprising:
    forming a single windshield opening in a forward section of a fuselage of an aircraft, an outer surface of the forward section having a curved shape;
    inserting a single injection molded windshield within the single windshield opening, wherein the single injection molded windshield is sized to fill the single windshield opening and shaped with an outer windshield surface conforming to the curved shape of the outer surface of the forward section; and
    attaching an inner surface of the single injection molded windshield to the forward section of the fuselage of the aircraft.

11. The method of claim 10, wherein the outer windshield surface includes a curvature in at least two intersecting planes.

12. The method of claim 10, further comprising molding the single injection molded windshield of at least one of:
    an injection molded acrylic; and
    an injection molded polycarbonate material.

13. The method of claim 10, further comprising attaching the single injection molded windshield to the forward section of the fuselage using a frameless attachment apparatus such that an edge of the single injection molded windshield directly contacts the outer surface of the forward section.

14. The method of claim 10, wherein the single injection molded windshield is attached to the forward section using a bracket bonded to the inner surface of the single injection molded windshield and configured to be coupled to the forward section of the fuselage of the aircraft.

15. An aircraft body, comprising:
    a fuselage including a curved section, an outer surface of the curved section defining a first curved shape;
    a window opening formed in the curved section;
    a single injection molded window panel having a second curved shape molded to fill the window opening and generally conform to the first curved shape of the curved section; and
    an attachment device securing an inner surface of the single injection molded window panel to the curved section of the fuselage.

16. The method of claim 15, wherein first curved shape includes a curvature in at least two intersecting planes.

17. The aircraft body of claim 15, wherein the single injection molded window panel includes at least one of:
    an injection molded acrylic; and
    an injection molded polycarbonate material.

18. The aircraft body of claim 15, further comprising attaching the single injection molded window panel to the curved section of the fuselage using a frameless attachment apparatus such that an edge of the single injection molded window panel directly contacts the outer surface of the curved section.

19. The aircraft body of claim 15, wherein the single injection molded window panel is attached to the curved section using a bracket bonded to the inner surface of the single injection molded window panel and configured to be coupled to the curved section of the fuselage.

20. The aircraft body of claim 15, wherein the aircraft body includes a commercial aircraft body.

* * * * *